(12) United States Patent
Simbürger

(10) Patent No.: US 8,017,163 B2
(45) Date of Patent: *Sep. 13, 2011

(54) RAPID DEVELOPMENT OF HEAT RESISTANCE IN CHOCOLATE AND CHOCOLATE-LIKE CONFECTIONERY PRODUCTS

(75) Inventor: Stephan Simbürger, Munich (DE)

(73) Assignee: Kraft Foods R & D, Inc., Northfield, IL (US)

( * ) Notice: Subject to any disclaimer, the term of this patent is extended or adjusted under 35 U.S.C. 154(b) by 73 days.

This patent is subject to a terminal disclaimer.

(21) Appl. No.: 12/480,483

(22) Filed: Jun. 8, 2009

(65) Prior Publication Data

US 2009/0246331 A1    Oct. 1, 2009

Related U.S. Application Data

(63) Continuation of application No. 11/312,298, filed on Dec. 20, 2005, now Pat. No. 7,579,031.

(30) Foreign Application Priority Data

Dec. 22, 2004 (EP) .................................... 04030416

(51) Int. Cl.
  *A23G 1/00* (2006.01)
(52) U.S. Cl. ........................ 426/241; 426/631
(58) Field of Classification Search .................. 426/241, 426/631
See application file for complete search history.

(56) References Cited

U.S. PATENT DOCUMENTS

| | | | |
|---|---|---|---|
| 4,045,583 A | | 8/1977 | Jeffery et al. |
| 4,056,583 A | * | 11/1977 | Shinoda et al. .............. 261/36.2 |
| 5,041,296 A | | 8/1991 | Byrne |
| 5,149,560 A | | 9/1992 | Kealey et al. |
| 5,160,760 A | | 11/1992 | Takemori et al. |
| 5,232,734 A | | 8/1993 | Takemori et al. |
| 5,486,376 A | | 1/1996 | Alander et al. |
| 6,165,540 A | | 12/2000 | Traitler et al. |
| 7,579,031 B2 | * | 8/2009 | Simburger .................... 426/241 |
| 2005/0118327 A1 | | 6/2005 | Best et al. |

FOREIGN PATENT DOCUMENTS

CH    647 930 A5    2/1985

* cited by examiner

Primary Examiner — Carolyn A Paden
(74) Attorney, Agent, or Firm — Fitch, Even, Tabin & Flannery

(57) ABSTRACT

The invention relates to a process for manufacturing heat-resistant chocolate or chocolate-like confectionery products wherein (I) chocolate mass or chocolate-like confectionery mass which has been mixed with a water-in-oil emulsion or (ii) chocolate mass or chocolate-like confectionery mass having an increased water content is moulded and then subjected to a microwave treatment prior to, during, and/or after cooling. The heat resistance is developed essentially instantaneously and the obtained product can be subjected to temperatures of up to about 40 or even 50° C. without losing its form. The invention also relates to the products obtainable by that process.

22 Claims, No Drawings

RAPID DEVELOPMENT OF HEAT RESISTANCE IN CHOCOLATE AND CHOCOLATE-LIKE CONFECTIONERY PRODUCTS

CROSS-REFERENCE TO RELATED APPLICATION

This application is a continuation of prior application Ser. No. 11/312,298, filed Dec. 20, 2005, which claims priority from European Application 04 030 416.4, filed on Dec. 22, 2004, which are hereby incorporated herein by reference in their entirety.

FIELD OF THE INVENTION

The present invention relates to a process for manufacturing heat-resistant chocolate or heat-resistant chocolate-like confectionery products and the products obtainable thereby.

BACKGROUND OF THE INVENTION

Conventional chocolate products cannot be stored or transported at temperatures of about 30° C. or higher without becoming soft and sticky. Many different attempts have been made to increase the heat stability of chocolate, such as the use of high-melting oils and fats or the use of substances which improve the integrity of the chocolate structure at higher temperatures.

Promising suggestions have been made with regard to the incorporation of water to improve heat stability. Regular chocolate contains about 1 percent water. The incorporation of additional water increases the heat stability of chocolate; there generally is, however, a delay, often on the order of several weeks, before the heat resistance is developed. Until such heat resistance is developed, it is necessary that the chocolate is maintained at temperatures below 30° C.; thus, storage and/or shipping under temperature controlled conditions until the desired heat stability is obtained is normally required.

U.S. Pat. No. 5,149,560 describes a heat-resistant chocolate prepared by adding moisture to chocolate by the addition of a stable water-in-oil emulsion (e.g., a reverse micelle emulsion) to tempered chocolate. Upon aging and stabilization, it is reported that cocoa butter crystallizes and thermal robustness develops. The heat resistance or thermal robustness (neither term is apparently defined) is reported to develop "after about 24 hours" or "after aging about 1 to 2 days in ambient conditions."

U.S. Pat. No. 5,160,760 describes a heat-resistant chocolate and a process for making same, wherein the chocolate consists essentially of a mixture of a water-in-oil emulsion and a chocolate base material, wherein the mixture contains an emulsifying agent and wherein a water-soluble material selected from saccharides and sugar alcohols is dissolved in the aqueous phase of the water-in-oil emulsion prior to mixing it with the chocolate base material. The increase in heat resistance (i.e., defined as shape retention at above 40° C. such that it is not "sticky to the direct touch") is reported to depend on time and is achieved by storing the products for about 20 days.

U.S. Pat. No. 5,486,376 describes a similar process, wherein the water-in-oil emulsion is a microemulsion wherein water is present in the form of droplets having a size of 10 to 1000 Å.

U.S. Pat. No. 6,165,540 describes another similar process comprising the preparation of a water-in-oil emulsion and the addition of a molten chocolate composition to the emulsion, and mixing the added molten chocolate composition and the emulsion so that destruction of the emulsion is substantially avoided and so that during the adding and mixing, the molten chocolate composition is added and the added molten chocolate composition and emulsion are mixed to obtain a chocolate mass product which comprises a fatty phase and contains water in the form of droplets distributed in the fatty phase and which contains the water in an amount of from 1 to 40 percent.

As noted, although these processes lead to an increase in the heat stability of the obtained chocolate products, this property unfortunately is not obtained immediately after shaping. Thus, it would be desirable to provide a process which allows the manufacture of chocolate or chocolate-like confectionery products with increased heat resistance which manifests itself essentially immediately (i.e., generally within about 60 minutes, more preferably within about 15 minutes of the microwave treatment, and even more preferably before the completion of the manufacturing process). The present invention provides such a process.

SUMMARY OF THE INVENTION

The present invention relates to a process for manufacturing heat-resistant chocolate or chocolate-like confectionery products wherein (i) a chocolate mass or a chocolate-like confectionery mass which has been mixed with a water-in-oil emulsion or (ii) a chocolate mass or chocolate-like confectionery mass having an increased water content is moulded and then subjected to a microwave treatment prior to, during, and/or after cooling to heat the interior of the chocolate mass to about 90 to about 135° C. (preferably to about 90 to 125° C. and more preferably to about 100 to 120° C.) for a total time of about 5 seconds to about 6 minutes (preferably for about 2 to about 4 minutes) to induce the formation of a secondary microstructure and provide heat resistance. Preferably, especially when the chocolate mass contains cocoa butter, the exterior of the microwave-treated chocolate mass is kept at about 30° C. or less by applying cold (generally about −20 to about to −50° C.) air to the exterior surface or other cooling means. The heat resistance or stability is developed essentially instantaneously (i.e., generally within about 60 minutes, more preferably within about 15 minutes of the microwave treatment, and even more preferably before the completion of the manufacturing process). The resulting heat resistant product can be subjected to temperatures of up to about 40 or even 50° C. very shortly after its manufacture without losing its form. Unless stated or implied otherwise, the term "chocolate mass" is intended to include "chocolate-like confectionery mass" and the term "chocolate product" is intended to include "chocolate-like confectionery product."

The present invention also relates to a process for producing heat resistant chocolate, said process comprising (1) providing a chocolate mass or chocolate-like confectionery mass containing at least about 1.8 percent water; (2) moulding the mass from step (1) to form moulded chocolate; and (3) cooling the moulded chocolate, wherein the moulded chocolate is subjected to a microwave treatment before, during, or after the cooling step, wherein the microwave treatment is effective to provide heat resistant to the chocolate essentially immediately after the microwave treatment.

The present invention also relates to a process for producing heat resistant chocolate, said process comprising (1) providing a chocolate mass or chocolate-like confectionery mass containing at least about 1.8 percent water; (2) moulding the mass from step (1) to form moulded chocolate; and (3) cooling the moulded chocolate, wherein the moulded chocolate is subjected to a microwave treatment before, during, or after the cooling step which is effective to heat the chocolate mass's interior to about 90 to about 135° C. (preferably to about 90 to 125° C. and more preferably to about 100 to 120° C.) for a total time of about 5 seconds to about 6 minutes (preferably for about 2 to about 4 minutes and preferably while maintaining the chocolate mass's exterior at about 30° C. or less), thereby inducing the formation of a secondary microstructure and providing heat resistant to the chocolate essentially immediately after the microwave treatment.

DETAILED DESCRIPTION OF THE PREFERRED EMBODIMENT

It was surprisingly found within the present invention that the heat resistance of chocolate can be developed essentially instantaneously by subjecting the chocolate mass, containing at least about 1.8 percent water, to a microwave treatment. The chocolate mass may be tempered or non-tempered. The microwave treatment is conducted after the water-containing chocolate mass has been shaped but before, during, and/or after cooling. There is no need to store the chocolate product for days or weeks in order to develop heat resistance since the heat resistance of the present products is developed essentially immediately after the microwave treatment. The products obtained by the process according to the present invention can be subjected to temperatures of up to about 40 or even 50° C. essentially immediately after their manufacture without losing their form.

Any conventional chocolate mass can be used within the present invention so long as the chocolate mass contains at least about 1.8 percent water, preferably about 1.8 to about 7 percent water, and more preferably about 1.8 to about 3 percent water. Moisture contents greater than about 3 percent may result in quality issues; thus, it is more preferred to use chocolate products containing about 1.8 to about 3 percent moisture.

It is not critical how the extra water is introduced into the chocolate mass. Thus, for example, a chocolate mass already having increased water content or a blended composition of the chocolate mass and either a water-in-oil emulsion, an oil-in-water emulsion, a nano-emulsion, or an aqueous foam material can be used; emulsifying agents may be to prepare such emulsions. Generally, a water-in-oil emulsion is preferably used to increase the moisture content of the chocolate.

Suitable water-in-oil emulsions for use in preparing the increased water chocolate mass generally consist of water, oils and/or fats, hydrophilic substances, and at least one emulsifying agent, wherein the water content is about 10 to about 70 percent. Many different oils and/or fats can be used to perform the invention. The preferred material is cocoa butter and the preferred amount of oils and/or fats is about 20 to about 60 percent. For chocolate-like confectionery products, vegetable oils such as sunflower oil, soy bean oil, rape seed oil, palm oil, and the like, as well as mixtures thereof, can be used; the preferred vegetable oil is an oxidative stable sunflower oil. Although not wishing to be limited by theory, the present invention allows the use of vegetable oils in place of cocoa butter since the secondary microstructure formed during the microwave treatment appears to help maintain the product in a solid form even when liquid oils are used. Hydrophilic substances which can be used within the present invention are, for example, saccharides and sugar alcohols, sorbitol being a preferred substance. The hydrophilic substances should preferably be present within the water-in-oil emulsions in an amount of about 30 to about 75 percent. The emulsifying agent which is preferably present in an amount of about 1 to about 5 percent can be selected from emulsifiers known in this field. Preferred are lecithins, fatty acid esters, and polyglycerol-condensed ricinoleic acid esters (PGPR).

The water-in-oil emulsion is prepared by adding and mixing the ingredients in the presence of the emulsifier in a conventional mixing apparatus at a temperature of about 30 to about 70° C. by adding oil and/or fat and the emulsifier first and water and/or water containing the hydrophilic substance next while stirring at a medium to high mixing speed. Preferably, the mixing speed should be such that the water droplet size, measured as D(90), will be about 10 μm. Smaller or higher droplet sizes may be used so long as the desired heat resistance is formed after microwave treatment of the resulting chocolate product.

The water-in-oil emulsion and chocolate mass or chocolate-like confectionery mass are then mixed in a weight ratio of about 5 to about 15 percent of the emulsion to about 95 to about 85 percent of chocolate mass or chocolate-like confectionery mass. The preferred ratio is about 10 percent to about 90 percent. Generally, the water-in-oil emulsion at mixing is at a temperature of about 25 to about 50° C. and preferably at about 25 to about 35° C. and the chocolate mass at mixing is about 25 to about 35° C. and preferably at about 26 to about 28° C. Preferably the temperature of the resulting blend is about 25 to about 35° C. and more preferably about 28 to about 30° C. after mixing. The mixing is carried out for about 1 to about 3 minutes.

The chocolate mass having an increased water content or the obtained mixture of the chocolate mass and the water-in-oil emulsion has a fat content of about 27 to about 35 percent and a water content of greater than about 1.8 percent, preferably about 1.8 to about 7 percent, and more preferably about 1.8 to about 3 percent. The mixture has an emulsifier content of about 0.5 to about 1.5 percent.

The chocolate mass or the mixture is then poured at a temperature of about 28 to about 35° C., and preferably at about 30° C., into a mould held at about the same temperature and agitated by a vibration system or the like in order to evenly distribute the mixture in the mould before it starts to firm up.

Prior to, during, or after cooling, the chocolate mass is subjected to a microwave treatment in order to rapidly develop heat resistance. Generally, if the microwave treatment occurs after cooling, it should preferably be carried out before packaging. Any conventional microwave source can be used. For example, a conventional 3.4-kW microwave oven or larger scale microwave tunnel is appropriate. Any frequency suitable for heating purposes is appropriate whereby the preferred frequencies are 2.45 Ghz and 5.8 Ghz. The distance between microwave source and chocolate mass is typically about 10 cm. The microwave treatment can be applied from the top and/or bottom but preferably alternately. The energy density induced by the magnetron to ensure immediate heat resistance is in the range of about 66 to about 11160 kJ/kg. Higher energy density values reduce the processing time from a few minutes to about 40 to about 50 seconds; lower energy density values will generally require longer treatment times.

The length and intensity of the microwave treatment should be effective to obtain the desired heat resistance and will depend, at least in part, on the dielectric constant, size, and shape of the chocolate product. As those skilled in the art will realize, the conditions of the microwave treatment (mainly its time duration and energy density) suitable for obtaining the desired heat resistance can easily be determined experimentally for a given chocolate product. Generally, however, for a moulded, bite-sized chocolate product, the microwave treatment conditions should be effective for heating the interior of the moulded chocolate about 90 to about 135° C. (preferably to about 90 to 125° C. and more preferably to about 100 to 120° C.). Generally, the interior temperature of the moulded chocolate should not be allowed to exceed 135° C. The microwave treatment should be carried out in a manner such that the chocolate product does not lose its form. Thus, for example, the microwave treatment can be carried out in a mould suitable for use in the microwave oven so that the product cannot flow during treatment. Alternatively, the exterior temperature can be controlled by passing a cold stream of air over the chocolate products during the microwave treatment. In one embodiment, the exterior temperature can be kept below about 30° C. If desired, the exterior temperature can be controlled by passing a cold stream of air over the chocolate products. Of course, other means (e.g., control of the time and intensity of the microwave treatment) or combinations of means can be used to maintain the product shape and/or keep the exterior temperature in the desired range during the microwave treatment. With chocolate products prepared with cocoa butter, it is generally preferred that the exterior temperature is kept below about 70° C. (and more preferably below about 30° C.) during the microwave treatment in order to prevent "bloom." The duration of the microwave treatment is generally about 5 seconds to about 6 minutes (preferably about 2 to about 4 minutes). The microwave treatment can be carried out in a single microwave cycle or in multiple microwave cycles with cooling during and/or between each microwave treatment cycle. Again, the conditions of the microwave treatment suitable for obtaining the desired heat resistance can easily be determined experimentally for a given chocolate product using the guidelines provided herein.

The chocolate or chocolate-like confectionery product can be packaged using suitable techniques after the microwave treatment and cooling. Since the resulting chocolate or chocolate-like confectionery product develops its heat resistance essentially immediately after the microwave treatment, it can be shipped and/or offered for sale immediately. Thus, storage under controlled conditions for days or weeks normally required to develop heat resistance in prior art products is not required.

The obtained chocolate or chocolate-like confectionery product, which is preferably a chocolate tablet, a filled chocolate tablet, a praline, an enrobed product, and the like, has an increased heat resistance immediately after the microwave treatment and can be exposed for prolonged times to temperatures of up to about 40° C. and even up to about 50° C. without losing its form. In addition to simply visible means (i.e., does the product retain its form under heat abuse condition), heat resistance can also be measured, for example, as the penetration force using a Stevens texture analyzer (e.g., 45° cone with a speed of 2 mm/sec to a depth of 3 mm) after the product is stored at 50° C. for two hours. Typically, heat resistant chocolate products of this invention will exhibit a penetration force of about 100 g or higher when exposed to 50° C. for 2 hours. Typically, chocolate-like confectionery products of this invention prepared using vegetable oils will exhibit a penetration force of about 150 g or higher under similar conditions. For comparison purposes, a conventional chocolate product would normally exhibit a penetration force of about 55 g or less.

The fact that it is not necessary according to the present invention to store the obtained chocolate products for days and weeks in order to develop heat resistance is a great advantage because it shortens the production time enormously.

Although not wishing to be limited by theory, it is believed that the microwave treatment affects the internal structure of the chocolate by creating a secondary micro-structure. This secondary microstructure appears to form a lattice or skeleton which maintains the structure of the product at higher temperatures and appears to provide the desired heat resistance. This secondary microstructure or interior structure can be made visible by extracting the fat from the finished product. Also near infrared spectroscopy measurements confirm the secondary microstructure of the microwave treated product. It appears that milk proteins are the main components of this secondary microstructure.

The invention will now be illustrated by specific examples which describe preferred embodiments of the present invention. They are not intended to limit the scope of the invention. Unless otherwise indicated, all ratios and percentages throughout this specification are by weight. All patents and other publications discussed in this specification are hereby incorporated by reference.

Example 1

Ingredients for cocoa confections of the "milk" and "white" types according to Table 1 were mixed and refined to the particle size as shown in Table 1. The refined flakes were mixed with the additional ingredients in a Stephan Mixer according to Table 2.

The masses were then blended with an emulsion prepared according to Table 3 in the ratios shown in Table 4 and moulded in hemispheres having diameters of about 22 mm. The moulded products, still in the mold, were subjected to a microwave treatment (10 s, full power in a Gigatherm Mammut microwave oven).

The "milk" product #1 with erythritol had a fudge-like texture.

The "milk" product #2 with xylitol was a firm body.

The "white" product appeared as a solid body.

Both samples with xylitol exhibited a significant cooling sensation (stronger than in conventional chocolate) while no significant cooling sensation was perceived with the erythritol sample.

TABLE 1

| Refined Flakes | Ingredient Amount (g) | | |
| --- | --- | --- | --- |
| | "milk" type #1 | "milk" type #2 | "white" type |
| Cocoa powder | 189.8 | 126.5 | 0 |
| Erythritol | 1498.7 | 0 | 0 |
| Xylitol | 0 | 999.1 | 949.3 |
| Lactose | 0 | 0 | 144.4 |
| Skim milk powder | 409.8 | 273.2 | 210.7 |
| Anhydrous milk fat | 146.5 | 97.6 | 78.2 |
| Sweet whey powder | 154.6 | 103.0 | 195.8 |
| Vanillin | 0.3 | 0.2 | 2.1 |
| Soya oil | 600.4 | 400.3 | 419.4 |
| Particle size D90 (μm) | 27.8 | 24.7 | 26.7 |

TABLE 2

| Confectionary Base | Ingredient Amount (g) | | |
| --- | --- | --- | --- |
| | "milk" type #1 | "milk" type #2 | "white" type |
| Refined flakes | 2796.0 | 1864.0 | 1885.0 |
| Hazel nut paste | 30.0 | 20.0 | |

TABLE 2-continued

| Confectionary Base | Ingredient Amount (g) | | |
|---|---|---|---|
| | "milk" type #1 | "milk" type #2 | "white" type |
| Soya oil | 153.3 | 102.2 | 105.2 |
| Lecithin | 20.7 | 13.8 | 9.8 |

TABLE 3

| Emulsion | Ingredient Amount (g) | | |
|---|---|---|---|
| | "milk" type #1 | "milk" type #2 | "white" type |
| Soya oil | 52.5 | 52.5 | 52.5 |
| Sorbitol syrup (70%) | 137.5 | 137.5 | 137.5 |
| Polyglycerol-polyrhinicoleate | 10.0 | 10.0 | 10.0 |

TABLE 4

| Chocolate | Component Amount (g) | | |
|---|---|---|---|
| | "milk" type #1 | "milk" type #2 | "white" type |
| Confectionery base | 225.0 | 225.0 | 225.0 |
| Emulsion | 25.0 | 25.0 | 25.0 |
| Water Content (%) | 2.8 | 2.8 | 2.8 |
| Microwave treatment | 10 seconds at full power | 10 seconds at full power | 10 seconds at full power |

The resulting samples exhibited good heat resistance at elevated temperatures (i.e., greater than about 30° C.).

Example 2

This example illustrates the production of a heat-resistant 100 g milk chocolate tablet. A water-in-oil emulsion was prepared comprising 26.4 percent cocoa butter, 70.6 percent sorbitol (30 percent moisture), and 3.1 percent PGPR. A milk chocolate base containing 45.3 percent sugar, 10.2 percent cocoa mass (containing 55 percent fat), 17.5 percent cocoa butter, 12.5 percent skimmed milk powder, 4.8 percent anhydrous milkfat, 8 percent sweet whey powder, 0.7 percent soya lecthin, and 1 percent flavor was prepared. The emulsion was mixed with tempered chocolate base in a ratio of 9.7 percent emulsion and 90.3 percent chocolate at a temperature of about 30° C. The overall water content of the mixture was 2.8 percent. The mixture was poured into a tablet mould and treated on a vibration table until evenly distributed while maintaining the temperature at about 28 to about 30° C. Prior to cooling, the mould was placed in a conventional 3.4-kW microwave oven for 90 seconds; the interior temperature of the moulded tablet was greater than about 90° C. After cooling to about 16° C., the microwaved tablet was demoulded and subjected to 45° C. temperature abuse conditions. Relative to a non-microwave-treated tablet made in the same manner, the microwave-treated tablet was superior in retaining its form under heat abuse conditions and demonstrated good heat resistance.

Example 3

This example illustrates the production of a heat-resistant 100 g white chocolate tablet. A water-in-oil emulsion was prepared comprising 26.4 percent cocoa butter, 70.6 percent sorbitol (30 percent moisture), and 3.1 percent PGPR. A white chocolate base containing 43.4 percent sugar, 4.6 percent lactose, 27.3 percent cocoa butter, 16.1 percent skimmed milk powder, 3.6 percent anhydrous milkfat, 4.6 percent sweet whey powder, and 0.5 percent soya lecthin was prepared. The emulsion was mixed with non-tempered white chocolate base in a ratio of 4.8 percent emulsion and 95.2 percent chocolate at a temperature of about 30° C. The overall water content was 1.8 percent. The mixture was poured into a tablet mould and treated on a vibration table until evenly distributed while maintaining the temperature at about 28 to about 30° C. Prior to cooling, the mould was placed in a conventional 3.4-kW microwave oven for about 90 seconds; the interior temperature of the moulded tablet was greater than about 90° C. After cooling to about 16° C., the microwaved tablet was demoulded and subjected to 45° C. temperature abuse conditions. Relative to a non-microwave-treated tablet made in the same manner, the microwave-treated tablet was superior in retaining its form under heat abuse conditions and demonstrated good heat resistance.

Example 4

This example illustrates the production of a heat-resistant 15 g chocolate-like confectionery tablet using sunflower oil. A water-in-oil emulsion was prepared comprising 26.4 percent sunflower oil, 70.6 percent sorbitol (30 percent moisture), and 3.1 percent PGPR. A chocolate-like confectionery base containing 51.1 percent sugar, 8.0 percent cocoa mass (containing 55 percent fat), 4.0 percent cocoa butter, 12.5 percent skimmed milk powder, 4.8 percent whey protein concentrate, 0.7 percent soya lecthin, 18.8 percent sunflower oil, and 0.1 percent flavor was prepared. The emulsion was mixed with the non-tempered chocolate-like confectionery base in a ratio of 13.2 percent emulsion, 85.5 percent chocolate-like confectionery mass, 1.3 percent sunflower oil, and 0.1 percent flavor at a temperature of about 30° C. The overall water content was 2.8 percent. The mixture was poured into a tablet mould containing 24 cavities (each suitable for containing about 15 g) and treated on a vibration table until evenly distributed while maintaining the temperature at about 28 to about 30° C. Prior to cooling, the mould was placed in a conventional 16 kW microwave tunnel for about 280 seconds; the interior temperature of the moulded tablet was greater than about 90° C. After cooling to about 16° C., the microwaved tablets were demoulded and subjected to 50° C. temperature abuse conditions. The microwave-treated chocolate-like confectionery retained its form under heat abuse conditions and demonstrated good heat resistance.

Various flavors can be incorporated into products produced in this manner to provide differing flavor profiles.

What is claimed is:

1. A process for manufacturing a heat-resistant chocolate product or a heat-resistant chocolate-like confectionery product, said process comprising:
    (1) mixing a chocolate or a chocolate-like confectionery with a water-in-oil emulsion to provide a chocolate mass or chocolate-like confectionery mass with water content of about 1.8 to about 7 weight percent;
    (2) moulding the chocolate mass or the chocolate-like confectionery mass from step (1) to form a moulded chocolate or chocolate-like confectionery mass;
    (3) cooling the moulded chocolate or chocolate-like confectionery mass; and
    (4) subjecting the moulded chocolate or chocolate-like confectionery mass, before, during, or after the cooling step (3), to a microwave treatment sufficient to provide essentially instantaneously the heat-resistant chocolate product or the heat-resistant chocolate like confectionery product.

2. The process according to claim 1, wherein the heat-resistant chocolate product or the heat-resistant chocolate-like confectionery product is in the form of a chocolate tablet, a filled chocolate tablet, a praline, or an enrobed chocolate product.

3. The process according to claim 1, wherein the microwave treatment is carried out with a microwave energy density of about 66 to about 11160 kJ/kg.

4. The process according to claim 1, wherein the moulded chocolate mass or the chocolate-like confectionery mass has a temperature of about 30° C. when it is subjected to the microwave treatment.

5. The process of claim 1, wherein the water-in-oil emulsion and the chocolate or chocolate-like confectionery are mixed in a weight ratio of about 5 to about 15 percent of the emulsion to about 95 to about 85 chocolate or chocolate-like confectionery.

6. The process of claim 5, wherein the ratio is about 10 percent emulsion to about 90 percent chocolate or chocolate-like confectionery.

7. The process of claim 1, wherein the water-in-oil emulsion has a D(90) water droplet size of about 10 μm.

8. The process of claim 1, wherein an exterior of the moulded chocolate mass or an exterior of the moulded chocolate-like confectionery mass is maintained at about 30° C. or less during the microwave treatment.

9. A process for producing heat resistant chocolate, said process comprising (1) providing a chocolate mass or chocolate-like confectionery mass containing about 1.8 to about 7 weight percent water; (2) moulding the mass from step (1) to form moulded chocolate; and (3) cooling the moulded chocolate, wherein the moulded chocolate is subjected to a microwave treatment before, during, or after the cooling step to provide the heat resistant chocolate essentially immediately after the microwave treatment, wherein at least a portion of the water in the chocolate mass or chocolate-like confectionery mass is obtained from a water-in-oil emulsion.

10. The process of claim 9, wherein the chocolate mass or chocolate-like confectionery mass of step (1) contains about 1.8 percent to about 3 percent water.

11. The process of claim 10, wherein the microwave treatment is carried out with a microwave energy density of about 66 to about 11160 kJ/kg for about 5 seconds to about 6 minutes.

12. The process of claim 9, wherein an exterior of the moulded chocolate is maintained at about 30° C. or less during the microwave treatment.

13. A process for producing heat resistant chocolate, said process comprising:
(1) providing a chocolate mass or chocolate-like confectionery mass containing about 1.8 to about 7 weight percent water;
(2) moulding the mass from step (1) to form moulded chocolate;
(3) cooling the moulded chocolate; and
(4) subjecting the moulded chocolate to a microwave treatment, before, during, or after the cooling step, wherein the microwave treatment is effective to heat the moulded chocolate mass's interior to about 90 to about 135° C. for about 5 seconds to about 6 minutes, thereby providing heat resistant to the chocolate essentially immediately after the microwave treatment, wherein at least a portion of the water in the chocolate mass or chocolate-like confectionery mass is obtained from a water-in-oil emulsion.

14. The process of claim 13, wherein the moulded chocolate mass's exterior is maintained at about 30° C. or less during the microwave treatment.

15. The process of claim 14, wherein the chocolate mass or chocolate-like confectionery mass contains about 1.8 to about 3 percent water.

16. The process of claim 14, wherein the moulded chocolate mass's interior is heated to about 100 to about 125° C. by the microwave treatment.

17. The process of claim 14, wherein the microwave treatment is carried out with a microwave energy density of about 66 to about 11160 kJ/kg.

18. The process of claim 13, wherein the chocolate mass or chocolate-like confectionery mass contains about 1.8 to about 3 percent water.

19. The process of claim 18, wherein the moulded chocolate mass's interior is heated to about 100 to about 125° C. by the microwave treatment.

20. The process of claim 13, wherein the moulded chocolate mass's interior is heated to about 100 to about 125° C. by the microwave treatment.

21. The process of claim 15, wherein the moulded chocolate mass's interior is heated to about 100 to about 125° C. by the microwave treatment.

22. The process of claim 13, wherein the microwave treatment is carried out with a microwave energy density of about 66 to about 11160 kJ/kg.

* * * * *